United States Patent [19]
McVey et al.

[11] Patent Number: 5,874,786
[45] Date of Patent: Feb. 23, 1999

[54] QUAD SPACECRAFT POWER BUS SYSTEMS

[75] Inventors: Michael McVey, Palo Alto; Steven M. Canzano, Sunnyvale, both of Calif.

[73] Assignee: Space Systems/Loral, Inc., Palo Alto, Calif.

[21] Appl. No.: 821,090

[22] Filed: Mar. 20, 1997

[51] Int. Cl.[6] .................................................. H02J 1/10
[52] U.S. Cl. .............................. 307/18; 307/9.1; 244/173
[58] Field of Search ................................. 307/9.1, 17, 18, 307/23, 29, 38, 46, 64–66, 80, 82, 42, 84, 150–153; 244/2, 173, 158 R, 53 R, 58, 60; 364/187; 323/906; 136/206, 244, 243, 251, 292; 342/352

[56] References Cited

U.S. PATENT DOCUMENTS

| | | |
|---|---|---|
| 4,654,846 | 3/1987 | Goodwin et al. ......................... 364/187 |
| 4,659,942 | 4/1987 | Volp ............................................. 307/42 |
| 5,285,208 | 2/1994 | Bertiger et al. ........................... 342/352 |

OTHER PUBLICATIONS

A Modular Multi–Mission Electrical Power Subsystem for Geosynchronous Satellites–Space Systems/Loral –SM Canzano, HF Webber, Az Applewhite, CK Hosick, HE Pollard, Jul./Aug. 1995.

*Primary Examiner*—Richard T. Elms
*Attorney, Agent, or Firm*—Perman & Green, LLP

[57] ABSTRACT

There is provided a power system for a spacecraft that includes a plurality of electrical loads. The power system comprises N segmented solar array panels. Each of the N segmented solar array panels comprises Y solar array segments. The power system also comprises a plurality of power source blocks, each of which includes a respective one of the Y solar array segments of a respective one of the N segmented solar array panels. The Y solar array segments receive solar energy and provide electrical energy as outputs of respective ones of the power source blocks. The power system further comprises at least one switch which is controllable for coupling electrical energy output by individual ones of the power source blocks to selected individual ones of the electrical loads.

18 Claims, 10 Drawing Sheets

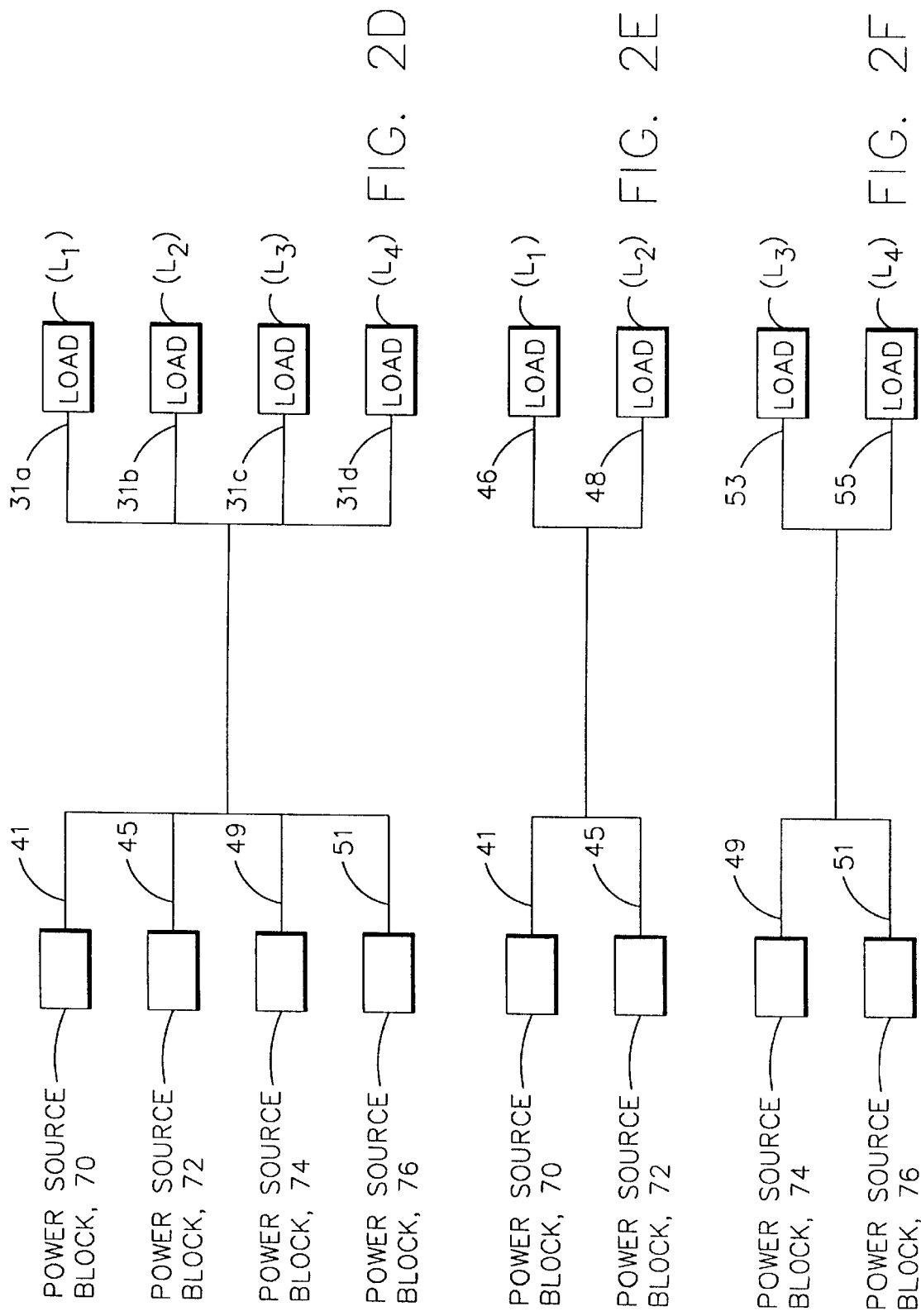

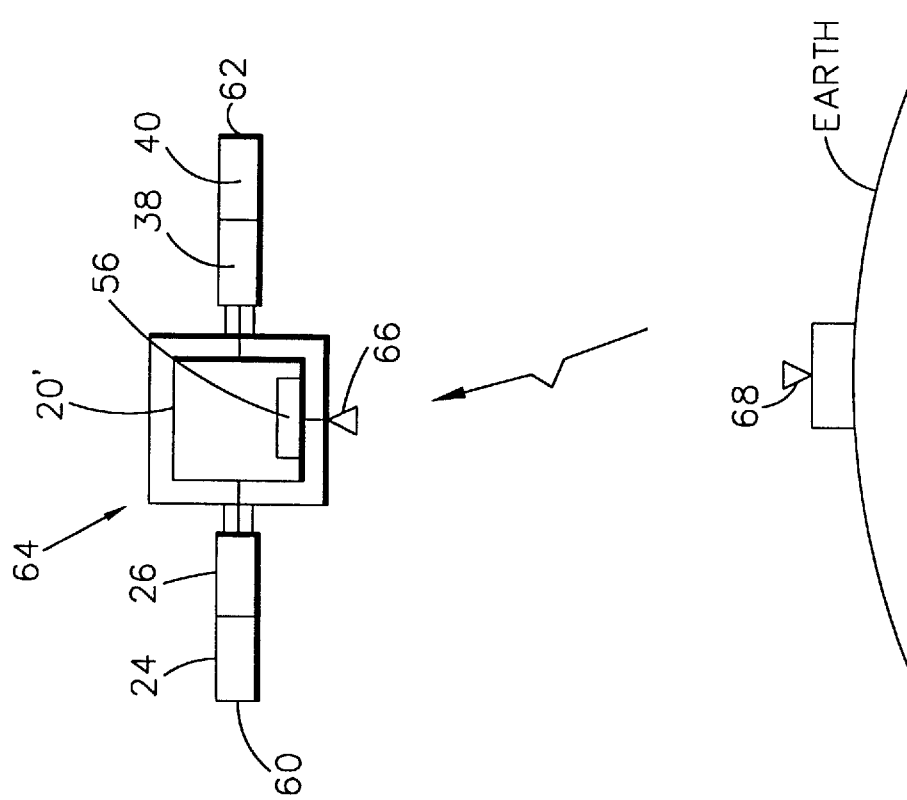

QUAD SPACECRAFT POWER BUS SYSTEMS

FIELD OF THE INVENTION

The invention relates to power systems for spacecraft and, in particular, this invention relates to quad spacecraft power bus systems.

BACKGROUND OF THE INVENTION

Most conventional communication spacecraft comprise two solar array panels which extend from opposite surfaces of the spacecraft. These solar array panels are employed to power spacecraft loads (e.g., communications hardware) during time periods when the spacecraft is exposed to rays of the sun. The solar arrays also generate energy that is subsequently stored within batteries located on the spacecraft. These batteries are used to power the spacecraft loads during time periods ("dark periods") when the spacecraft is not exposed to solar energy.

Conventional communication spacecraft also include power electronics circuits for regulating output voltages of the solar array panels and batteries to predetermined voltage levels. After regulating the output voltages of these devices, the power electronics circuits distribute power to designated spacecraft loads.

FIG. 1a shows an example of a single power bus system 1 for a spacecraft. The system 1 includes a solar array 2, a battery 4, and a power electronics block or circuit 6. The power electronics block 6 has an output that is coupled to a spacecraft electrical load (L) via a bus 8. The solar array 2 powers the load (L) during periods when the solar array 2 is exposed to rays of the sun, and the battery 4 is used to power the load (L) during dark periods. The system 1 suffers from a disadvantage that it does not provide a high degree of performance reliability (i.e., fault tolerance). For example, in the event that one or more of the components of the system 1 become short circuited, the spacecraft load (L) can experience a total power loss.

An example of a conventional dual power bus system 3 for a space craft is shown in FIG. 1b. The system 3 includes two single power bus systems that are labelled "9a" and "9b". Each of the systems 9a and 9b is similar to the system 1 of FIG. 1a. An output of the system 9a is connected through bus 8 to an input 11a of a switch or relay 11, and an output of system 9b is connected through another bus 8 to an input 11b of the switch 11. Outputs 11c and 11d of the switch 11 are connected to electrical loads $(L_A)$ and $(L_B)$, respectively, via a set of primary buses 10 and 12. The switch 11 is controllable by a controller (not shown) in a known manner for coupling power output by the individual systems 9a and 9b to selected ones of the loads $(L_A)$ and $(L_B)$ of the spacecraft.

The dual power bus system 3 can provide a greater level of performance reliability for powering spacecraft loads than can be provided by the single power bus system 1. This can be understood in view of the following exemplary situation. In this exemplary situation, it is assumed that while the systems 9a and 9b of the system 3 are being used to power the loads $(L_A)$ and $(L_B)$, respectively, the bus 10 becomes short circuited and, as a result, no power is provided to the load $(L_A)$. It is also assumed that the system 9b remains unaffected by the short circuit that occurs to the bus 10. As can be appreciated, although power is no longer provided to the load $(L_A)$ due to the short circuit, power is still provided to the load $(L_B)$ from system 9b, and thus there is no total loss of the spacecraft loads. Therefore, assuming that at least a portion of the load $(L_B)$ includes hardware for communicating with a ground station, communications can still be effected between the spacecraft and the ground station.

Although the system 3 can provide a greater level of performance reliability than the system 1 of FIG. 1a, the level of performance reliability that can be provided by the system 3 is nevertheless limited. By example, for a case in which both of the primary buses 10 and 12 become short circuited, both of the loads $(L_A)$ and $(L_B)$ may experience a loss of power. It can therefore be appreciated that, although the prior art power systems 1 and 3 may be suitable for their intended applications, they may not be suitable in other applications which require a greater degree of system performance reliability than can be provided by the systems 1 and 3. Therefore, it would be desirable to provide a spacecraft power system that can provide a greater level of performance reliability than is provided by these conventional spacecraft power systems.

The prior art power systems 1 and 3 also suffer from another shortcoming. Regulated output voltage levels provided by typical, commercially-available power electronics circuits such as, for example, the blocks 6 of the systems 1 and 3, are generally about 28 volts ±2 volts or 100 volts ±2 volts. Unfortunately, in some cases in which these power electronics circuits are employed in the systems 1 and 3, such power levels are insufficient for supporting high spacecraft load demands. As a result, a need can arise for designing and manufacturing power electronics circuits that can provide higher regulated power levels for these systems 1 and 3. Unfortunately, however, it can be expensive and time consuming to design and manufacture such higher power regulation circuits. Therefore, it would be desirable to provide a spacecraft power system that can power spacecraft loads having high power demands, while employing commonly-available power electronics circuits.

OBJECTS OF THE INVENTION

It is an object of this invention to provide a spacecraft power system which can provide a higher degree of performance reliability than can be provided by conventional spacecraft power systems.

Further objects and advantages of this invention will become apparent from a consideration of the drawings and ensuing description.

SUMMARY OF THE INVENTION

The foregoing and other problems are overcome and the objects of the invention are realized by a quad spacecraft power bus system for a spacecraft. According to one embodiment of the invention, the quad spacecraft power bus system comprises N segmented solar array panels, a plurality of power source blocks, and a switch or relay. Each of the N segmented solar array panels includes Y solar array segments (e.g., solar cells). Each of the power source blocks includes a respective one of the Y solar array segments of one of the N segmented solar array panels. The individual solar array segments receive solar energy and provide, in response, electrical energy as outputs of respective ones of the power source blocks. In a preferred embodiment of the invention, N is equal to 2, and Y is equal to 2.

The switch is controllable by a controller for coupling electrical energy being output by individual ones of the power source blocks to selected ones of a plurality of spacecraft electrical loads, thereby enabling the electrical loads to be powered by the power source blocks. The controller can control the switch in accordance with information uplinked to the spacecraft from a terrestrial station.

According to another embodiment of the invention, a quad spacecraft power bus system is provided which is similar to that described above, except that there are two switches included in the system. In this embodiment of the invention, a first one of the two switches is controllable by the controller for coupling electrical energy output by individual ones of a first pair of the power source blocks to selected ones of a first pair of the spacecraft electrical loads. A second one of the switches is controllable by the controller for coupling electrical energy output by individual ones of a second pair of the power source blocks to selected ones of a second pair of the electrical loads.

In accordance with another embodiment of the invention, a quad spacecraft power bus system is provided which is also similar to that described above, except that there are three switches included in the system. In this embodiment of the invention, a first one of the switches, which has a first plurality of inputs and a second plurality of inputs, is controllable by the controller for coupling electrical energy being applied to the individual inputs of the switch to selected ones of the spacecraft electrical loads. A second one of the switches is also controllable by the controller for coupling electrical energy from individual ones of the first pair of power source blocks to selected ones of the first plurality of inputs of the first switch. Similarly, a third one of the switches is controllable by the controller for coupling electrical energy from individual ones of the second pair of power source blocks to selected ones of the second plurality of inputs of the first switch.

According to a further embodiment of the invention, a quad spacecraft power bus system is provided which includes four individual power systems and a plurality of buses. A first pair of the individual power systems includes solar array segments of a first segmented solar array panel of the spacecraft. A second pair of the individual power systems includes solar array segments of a second segmented solar array panel of the spacecraft. Individual ones of the buses are coupled between outputs of respective ones of the individual power systems and respective electrical loads of the spacecraft, thereby enabling the loads to be powered by the individual power systems during periods when the spacecraft is exposed to solar energy.

For each of the embodiments described above, at least one battery is also provided for supplying electrical energy to the electrical loads via the switches during time periods when the spacecraft is not exposed to solar energy. Also, each power source block further includes a power electronics circuit that includes a voltage regulator for regulating output voltages of a solar array panel segment and a battery associated with the power source block.

The various embodiments of the quad spacecraft power bus system described above can provide a greater level of system performance reliability (i.e., a greater fault tolerance level) than is provided by conventional spacecraft power bus systems.

BRIEF DESCRIPTION OF THE DRAWINGS

The above set forth and other features of the invention are made more apparent in the ensuing Detailed Description of the Invention when read in conjunction with the attached Drawings, wherein:

FIG. 2d is a diagram representing possible power source and load interconnections provided by the quad spacecraft power bus system of FIG. 2a;

FIGS. 2e and 2f show diagrams representing possible power source and load interconnections provided by another quad spacecraft power bus system of the invention;

FIG. 3a illustrates a terrestrial station and a spacecraft, wherein the spacecraft includes a quad spacecraft power bus system of the invention;

DETAILED DESCRIPTION OF THE INVENTION

Figure 2A:
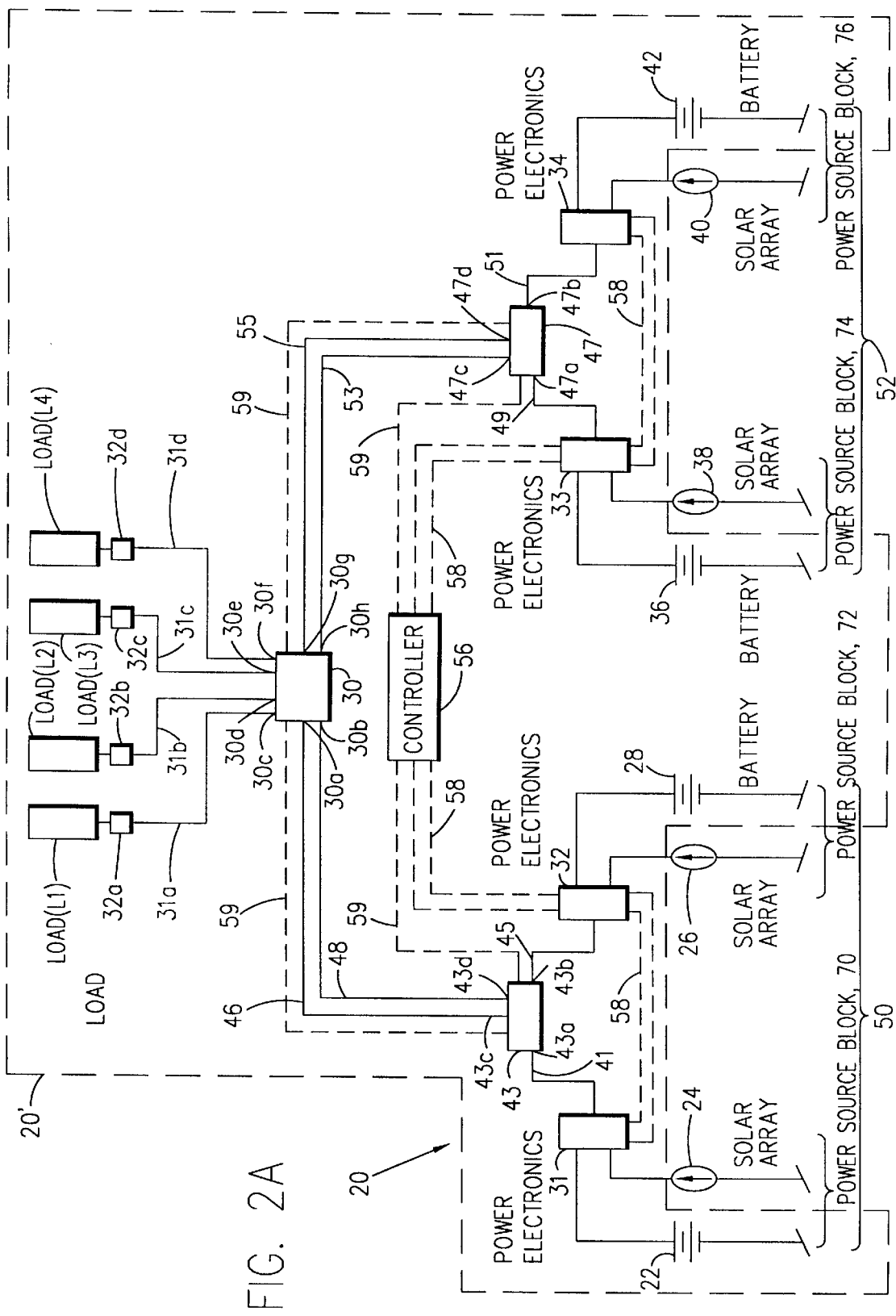
FIG. 2a illustrates a block diagram of quad spacecraft power bus system that is constructed in accordance with an embodiment of the invention.

FIG. 2a illustrates a block diagram of a quad spacecraft power bus system 20 that is constructed in accordance with one embodiment of the invention. The quad spacecraft power bus system 20 (hereinafter also referred to as a "power bus system 20") is comprised of a first dual power bus system 50, a second dual power bus system 52, a relay or switch matrix 30, a controller 56, a switching control circuit 59, and a plurality of primary buses 31a, 31b, 31c and 31d. The first dual power bus system 50 is comprised of batteries 22 and 28, solar array segments (hereinafter referred to as "solar arrays") 24 and 26, power electronics blocks 31 and 32, a first bus 41, a second bus 45, a relay or switch matrix 43, a third bus 46, and a fourth bus 48. The battery 22 and the solar array 24 are connected to respective inputs of the power electronics block 31. Similarly, the battery 28 and the solar array 26 are connected to respective inputs of the power electronics block 32. An output of the power electronics block 31 is coupled to a first input 43a of the switch 43 via the first bus 41. Similarly, an output of the power electronics block 32 is coupled to a second input 43b of the switch 43 via the second bus 45. Switch 43 has a pair of outputs 43c and 43d that are coupled to a first input 30a and a second input 30b, respectively, of the switch 30 via the third bus 46 and the fourth bus 48, respectively. According to a preferred embodiment of the invention, the switch 43 may be similar to switch matrix 13 shown in FIG. 2g, although any other suitable type of switch or relay may be employed such as, for example, a cross-strapping relay. Inputs 13a and 13b, and outputs 13c and 13d of the switch matrix 13 of FIG. 2g form the first input 43a, the second input 43b, and the outputs 43c and 43d, respectively, of the switch matrix 43 of FIG. 2. The switch 43 is controllable by the controller 56 over the switching control circuit 59, as will be further described below.

For the purposes of this description, the battery 22, the solar array 24, the power electronics block 31, and the first bus 41 are collectively referred to as a "first power bus system 70" or "power source block 70", and the battery 28, the solar array 26, the power electronics block 32, and the second bus 45 are collectively referred to as a "second power bus system 72" or "power source block".

The second dual power bus system 52 is comprised of batteries 36 and 42, solar array segments (hereinafter referred to as "solar arrays") 38 and 40, power electronics blocks 33 and 34, a first bus 49, a second bus 51, a relay or switch matrix 47, a third bus 53, and a fourth bus 55. The battery 36 and the solar array 38 are each connected to respective inputs of the power electronics block 33. Similarly, the battery 42 and the solar array 40 are each connected to respective inputs of the power electronics block 34. An output of the power electronics block 33 is coupled to a first input 47a of the switch 47 via the first bus 49. Similarly, an output of the power electronics block 34 is coupled to a second input 47b of the switch 47 via the second bus 51. Switch 47 has an output 47c that is coupled to a third input 30h of the switch 30 via the third bus 53. Switch 47 also has an output 47d that is coupled to a fourth input 30g of the switch 30 via the fourth bus 55. As for the switch 43 described above, according to a preferred embodiment of the invention, the switch 47 may be similar to the switch matrix 13 shown in FIG. 2g, although any other suitable type of switch or relay may be employed. Input 47a and 47b, and outputs 47c and 47d of the switch 47 correspond to the inputs 13a and 13b, and the outputs 13c and 13d, respectively, of the switch matrix 13 of FIG. 2g. The switch 47 is also controllable by the controller 56 over the switching control circuit 59, as will be further described below.

For the purposes this of description, the battery 36, the solar array 38, the power electronics block 33, and the fourth bus 49 are collectively referred to as a "third power bus system 74" or "power source block 74", and the battery 42, the solar array 40, the power electronics block 34, and the bus 51 are collectively referred to as a "fourth power bus system 76" or "power source block".

Figure 2B:
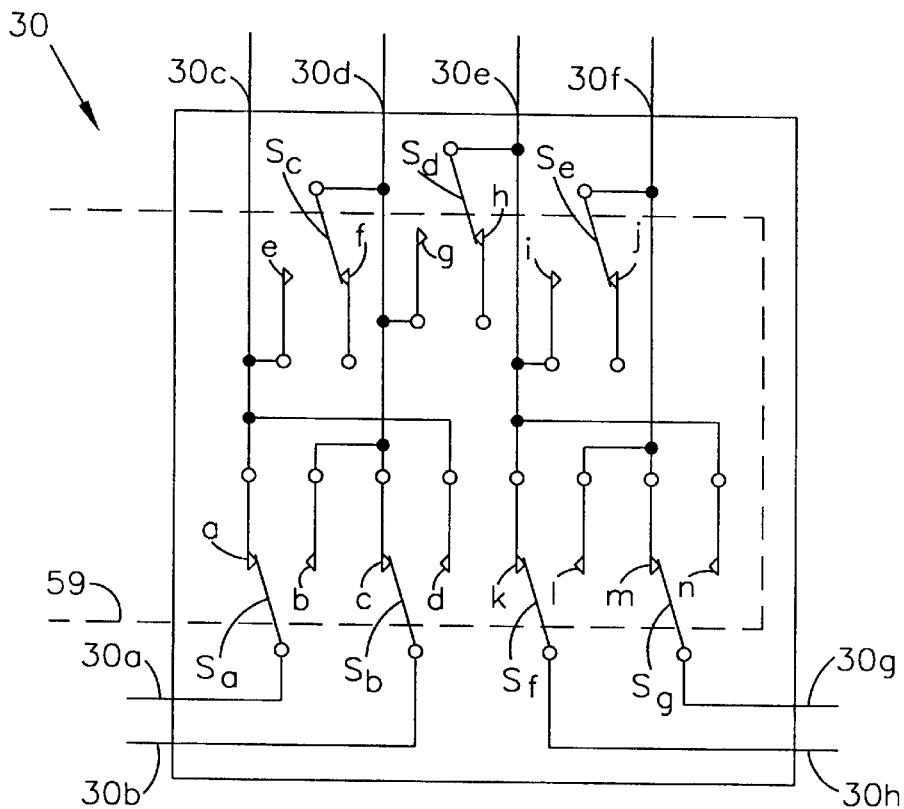
FIG. 2b illustrates a block diagram of another switch matrix.

In accordance with a preferred embodiment of the invention, switch 30 has a switch matrix configuration as is shown in FIG. 2b. The operation of the switch matrix 30 shown in FIG. 2b is readily understood by those skilled in the art, and thus will not be described in detail. The switch 30 is also controllable by the controller 56 over the switching control circuit 59, as will be further described below.

An output 30c of the switch 30 is connected through primary bus 31a and a load protection device 32a to a spacecraft 30 load ($L_1$). An output 30d of the switch 30 is connected through primary bus 31b and a load protection device 32b to a spacecraft load ($L_2$). Similarly, outputs 30e and 30f of the switch 30 are connected to respective spacecraft loads ($L_3$) and ($L_4$) via respective primary buses 31c and 31d and respective load protection devices 32c and 32d. Each of the loads ($L_1$), ($L_2$), ($L_3$) and ($L_4$) may include, by example, power distribution panels that support various spacecraft sub-loads such as, by example, communications hardware, pumps, imaging devices such as weather sensors, and/or some other designated electrical loads within the spacecraft. The load protection devices 32a–32d may include, by example, fuses, an electronic circuit breaker, multiple layers of an electrical isolation material, or some other suitable mechanism for protecting the loads from fault currents that may occur in the system 20. Also, each of the buses of the system 20 includes an electrical conductor such as, for example, one or more electrical cables. As can be appreciated, the size and number of cables employed depends on the amount of current needed to be conducted by the cables to the loads.

Figure 3B:
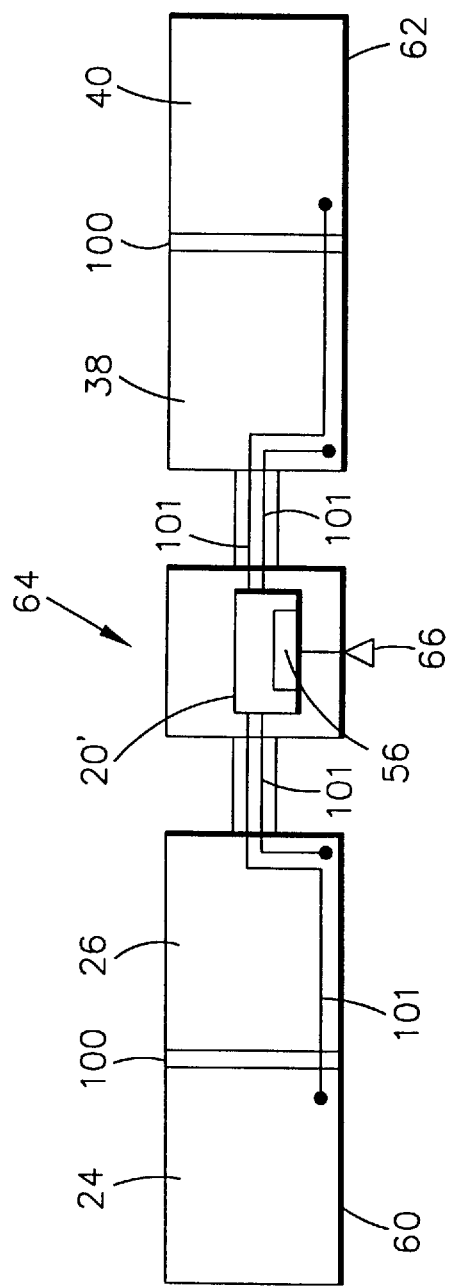
FIG. 3b also illustrates the spacecraft of FIG. 3b.

Before describing the manner in which the system 20 functions, reference will first be made to FIGS. 3a and 3b. FIG. 3a shows a spacecraft 64 and a terrestrial station 68, and FIG. 3b shows the spacecraft 64. The spacecraft 64 includes an antenna 66, solar arrays 24, 26, 38 and 40, and a block 20', which represents a portion of the quad spacecraft power bus system 20, excluding the solar arrays 24, 26, 38 and 40. The controller 56 is also shown within the block 20'. According to a preferred embodiment of the invention, solar array segments 24 and 26 form a first solar panel "wing" 60 that extends from one surface of the spacecraft 64, and solar array segments 38 and 40 form a second solar panel "wing" 62 that extends from another surface of the spacecraft 64, although any other suitable number of solar array segments per solar panel wing 60 and 62 may be provided. Each solar array segment 24, 26, 38, and 40 from a respective one of the solar array panels 60 and 62 is coupled to the block 20' via one or more wires 101 (FIG. 3b). As can be appreciated, the number of wires employed depends on the amount of current being conducted.

For each solar array panel wing 60 and 62, the respective solar array segments 24, 26 and 38, 40 may be mounted on a substrate 100 (FIG. 3b). In other embodiments, each solar array 24, 26, 38, and 40 may be provided on its own solar panel wing extending from the spacecraft's outer surface. Also, in further embodiments, some or all of the solar panels may be located on the body of the spacecraft itself. In this case, each solar panel may be segmented, and each solar array segment may be coupled to the block 20' via one or more wires.

In a preferred embodiment of the invention, the solar arrays 24, 26, 38 and 40 are used to power the loads ($L_1$), ($L_2$), ($L_3$) and ($L_4$) during periods when the solar arrays 24, 26, 38 and 40 are receiving solar energy. The batteries 22, 28, 36 and 42 are preferably used to power the loads ($L_1$) ($L_2$), ($L_3$) and ($L_4$) during "dark periods" when the solar arrays 24, 26, 38 and 40 are not receiving solar energy. Preferably, the loads ($L_1$) ($L_2$), ($L_3$) and ($L_4$) are balanced, and each of the solar arrays 24, 26, 38 and 40 is sized so that, when illuminated, the solar array can provide enough power for supporting the demand of at least one of the loads ($L_1$), ($L_2$), ($L_3$) and ($L_4$). Also, each of the batteries 22, 28, 36 and 42 is preferably sized so as to be able to provide enough power f or supporting the demand of at least one of the loads ($L_1$) ($L_2$), ($L_3$) and ($L_4$) . and the various other components of the power bus systems 70–76, as well as the switch 30, the buses 46, 48, 53, 55, and 31a–31d, and the protective devices 32a–32d, are all preferably sized to be able to conduct enough current for supporting at least one of the loads.

The determination of whether or not the solar arrays 24, 26, 38 and 40 are receiving solar energy is made in accordance with any known technique. Similarly, the technique employed by the system 20 for enabling the batteries 22, 28, 36 and 42 to power the loads during dark periods may be any suitable technique known in the art. For example, the controller 56 may control switching circuitry located within the power electronics blocks 31–34 to couple outputs of the batteries 22, 28, 36 and 42 to the buses 46, 48, 53 and 55 during these dark periods, thereby enabling power to be provided to the loads ($L_1$), ($L_2$), ($L_3$), and ($L_4$) from the batteries 22, 28, 36 and 42. The switching circuitry can be controlled by the controller 56 over a control circuit 58. For example, when the output voltage or current of the solar arrays falls below a predetermined threshold, the switchover to battery power can be automatically made.

The controller 56 can also control the switching circuitry in accordance with a command signal received by the spacecraft 64 from the terrestrial station 68. This may be understood in view of the following example. In this example, it is assumed that the switching circuitry of power electronics block 31 is being controlled to couple an output of the solar array 24 to the first bus 41. It is also assumed that it is desired to control this switching circuitry from the terrestrial station 68 so that the switching circuitry de-couples the solar array output from the first bus 41, and couples an output of the battery 22 to the first bus 41. This can be achieved in the following manner.

A command signal is uplinked from the terrestrial station 68 to the spacecraft 64. The command specifies that the controller 56 control the switching circuitry of power electronics block 31 to de-couple the output of solar array 24 from the first bus 41, and to couple the output of battery 22 to the first bus 41. The signal is received by antenna 66. The signal is then demodulated to baseband and the command is routed to the controller 56. The controller 56 then controls the switching circuitry of the power electronics block 31 over the control circuit 58 to function in accordance with the command signal received from the terrestrial station 68.

Each of the power electronics blocks 31–34 also preferably includes circuitry for regulating output voltages of respective ones of the solar arrays 24, 26, 38 and 40, and respective ones of the batteries 22, 28, 36, and 42, to predetermined voltage levels. The predetermined voltage levels may be, for example, example, 28 volts ±2 volts or 100 volts ±2 volts.

As can be appreciated, the switches 43, 47, and 30 are controllable by the controller 56 via a switching control circuit 59 for enabling the individual loads ($L_1$), ($L_2$), ($L_3$) and ($L_4$) to be powered by selected ones of the power bus systems 70, 72, 74 and 76. The switches 43, 47, and 30 can be controlled by the controller 56 to provide various switching arrangements which enable various system component interconnections to be achieved. The switches 43, 47, and 30 can be controlled by the controller 56 in accordance with, by example, information provided to the spacecraft 64 from the terrestrial station 68.

A diagram representing possible interconnections between the single power bus systems 70–76, the respective buses 41, 45, 49, and 51, the respective primary buses 31a, 31b, 31c, and 31d, and the respective loads ($L_1$), ($L_2$), ($L_3$), and ($L_4$), as can be provided by the various switching arrangements of the system 20, is shown in FIG. 2d. As can be appreciated, individual ones of the loads ($L_1$), ($L_2$), ($L_3$) and ($L_4$) can be powered by any selected individual ones of the power bus systems 70–76. This may be further understood in view of the following exemplary situations.

In a first exemplary situation, it is assumed that each of the solar arrays 24, 26, 38, and 40 can output a sufficient amount of power for supporting the load demand of at least one of the loads ($L_1$), ($L_2$), ($L_3$), and ($L_4$) . It is also assumed that it is desired that solar array 24 of power bus system 70 provide power to load ($L_1$) via buses 41 and 31a, that solar array 26 of power bus system 72 provide power to load ($L_2$) via buses 45 and 31b, that solar array 38 of power bus system 74 provide power to load (11) via buses 49 and 31c, and that solar array 40 of power bus system 76 provide power to load ($L_4$) via buses 51 and 31d. In this case, a signal is uplinked from the terrestrial station 68 to the spacecraft 64. The signal specifies, for example, that the controller 56 control the switches 43, 47, and 30 so as to provide the desired component interconnections. After the signal is received by the antenna 66, and is thereafter forwarded to the controller 56, the controller 56 controls the switches 43, 47, and 30 over switching control circuit 59 in accordance with the uplinked signal. For example, the controller 56 controls the switch 43 so that switching contacts ($S_a$), ($S_b$), and ($S_c$) (see switch matrix 13 of FIG. 2g) become coupled to respective contacts (a), (c), and (f) of the switch 43. As a result, signals that are output by the solar array 24, and which are thereafter forwarded through the power electronics block 31 and the bus 41, are coupled through the switch 43 via input 43a and output 43c of the switch 43, and are then forwarded to input 30a of switch 30 via the bus 46. Similarly, signals that are output by the solar array 26, and which are thereafter forwarded through the power electronics block 32 and the bus 45, are coupled through the switch 43 via the input 43b and the output 43d of the switch 43, and are then forwarded to input 30b of switch 30 via bus 48. Switch 47 is controlled in a similar manner so that signals which are output by the solar array 38, and which are thereafter forwarded through the power electronics block 33 and the bus 49, are coupled through the switch 47 via input 47a and output 47c of the switch 47, and are then forwarded to input 30h of switch 30 via the bus 53. Moreover, switch 47 is controlled so that signals that are output by the solar array 40, and which are thereafter forwarded through the power electronics block 34 and the bus 51, are coupled through the switch 47 via input 47b and output 47d of the switch 47. Thereafter, the signals then forwarded to input 30g of the switch 30 via the bus 55.

Also in this example, switching contacts ($S_a$), ($S_b$), ($S_c$), ($S_d$), ($S_e$), ($S_f$), and ($S_g$) of the switch 30 are controlled by the controller 56 over switching control circuit 59 to couple to respective contacts (a), (c), (f), (h), (j), (k), and (m) of the switch 30. As a result, signals that are applied to inputs 30a, 30b, 30g, and 30h of the switch 30 are coupled through the switch 30 to respective outputs 30c, 30d, 30f, and 30e of the switch 30. After the signals are output by the outputs 30c, 30d, 30e, and 30f of switch 301, they are then provided to the respective loads ($L_1$), ($L_2$), ($L_3$), and ($L_4$) via the respective primary buses 31a, 31b, 31c, and 31d, and the respective protection devices 32a, 32b, 32c, and 32d. In this manner, the loads ($L_1$), ($L_2$), ($L_3$), and ($L_4$) are powered by the individual solar arrays 24, 26, 38, and 40, respectively.

As another example, the switch 30 can be controlled to enable the individual loads ($L_1$) and ($L_2$) to be powered by the power bus systems 72 and 70, respectively, and to enable the loads ($L_3$) and ($L_4$) to be powered by power bus systems 76 and 74, respectively. In this example, it is assumed that the switches 43 and 47 have been controlled in a similar manner as was described above so that output signals of power bus systems 70, 72, 74, and 76 are coupled to respective inputs 30a, 30b, 30h, and 30g of the switch 30 via the buses 46, 48, 53, and 55, respectively. The switching contacts ($S_a$) and ($S_b$) of switch 30 are also controlled by the controller 56, over switching control circuit 59, to couple to contacts (b) and (d), respectively. Also, the switching contacts ($S_f$) and ($S_g$) are controlled by the controller 56 over the switching control circuit 59 to couple to contacts (l) and (n), respectively. Thereafter, the signals that are applied to the input 30a, 30b, 30g, and 30h of the switch 30 are supplied to the respective loads ($L_2$), ($L_1$), ($L_3$) and ($L_4$) . In this manner, the loads ($L_1$) and ($L_2$) are powered by the solar arrays 26 and 24, respectively, and the loads ($L_3$) and ($L_4$) are powered by the solar arrays 40 and 38, respectively.

As can be appreciated, other switching configurations can be provided to enable the loads ($L_1$), ($L_2$), ($L_3$) and ($L_4$) to be powered by other ones of the power bus systems 70–76. As can also be appreciated, for case in which, by example, each individual power bus system 70–76 can provide a sufficient amount of output power (e.g., from the solar array or battery of the system) for supporting the demand of more than one of the loads ($L_1$), ($L_2$), ($L_3$) and ($L_4$), the switches 43, 47 and 30 can be controlled to enable more than one of these loads to be powered by a single selected one of the power bus systems 70–76. Furthermore, the switches 43, 47 and 30 can be controlled to couple output power from more than one of the power bus systems 70–76 to selected individual ones of the loads ($L_1$), ($L_2$), ($L_3$) and ($L_4$)

Figure 4:
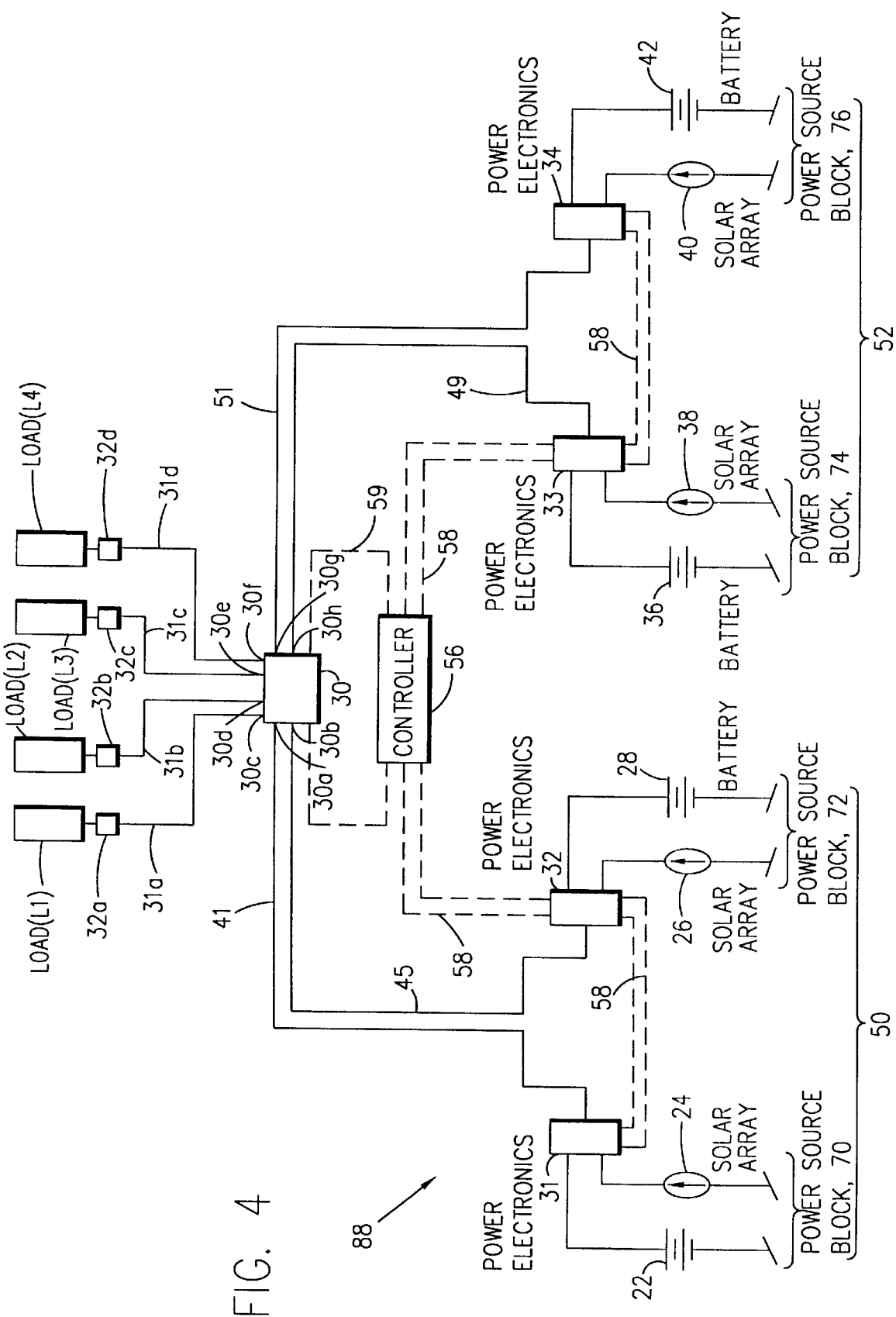
FIG. 4 illustrates a block diagram of a quad spacecraft power bus system that is constructed in accordance with another embodiment of the invention.

FIG. 4 shows a quad spacecraft power bus system 88 that is constructed in accordance with another embodiment of the invention. The quad spacecraft power bus system 88 is similar to the system 20 shown above, except that the system 88 does not include switches 43 and 47. Thus, the outputs of the power electronics blocks 31–34 of the respective single power bus systems 70–76 are coupled directly to respective inputs 30a, 30b, 30h, and 30g of switch 30 via the respective buses 41, 45, 49, and 51. The switch 30 functions in a similar manner as was described above, and enables the individual loads ($L_1$), ($L_2$), ($L_3$), and ($L_4$) to be powered by selected ones of the solar arrays 24, 26, 38, and 40 via various switching arrangements. The possible component interconnections provided by these various switching arrangements is represented by the diagram shown in FIG. 2d.

Figure 5:
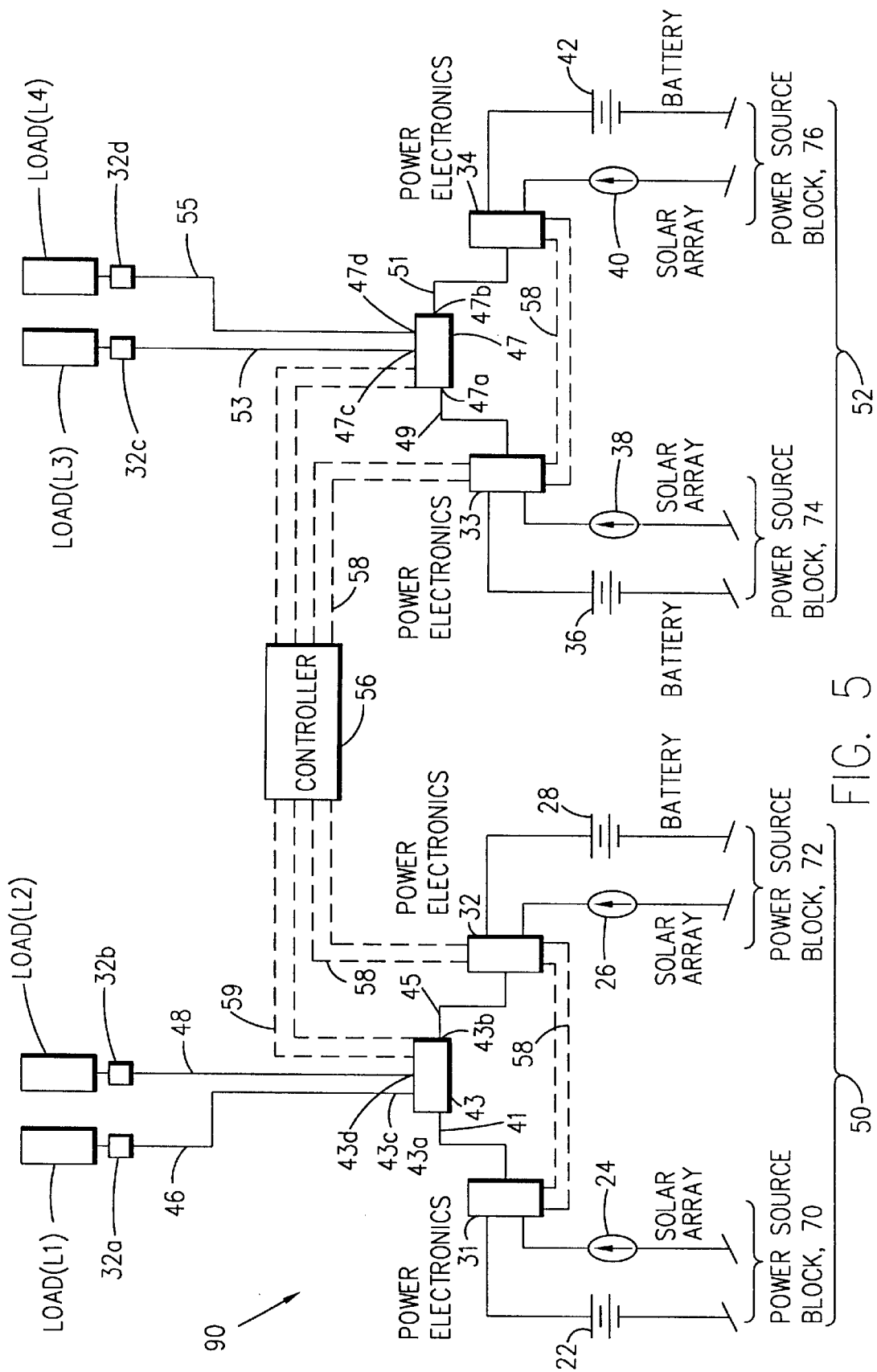
FIG. 5 illustrates a block diagram of a quad spacecraft power bus system that is constructed in accordance with another embodiment of the invention.

FIG. 5 shows a quad spacecraft power bus system 90 that is constructed in accordance with another embodiment of the invention. In this embodiment of the invention, the dual power bus systems 50 and 52, the controller 56, the buses 46, 48, 53, and 55, and the protective devices 32a–32d are similar to those of system 20 described above. However, in this embodiment of the invention, no switch 30 is provided. Also, outputs 43c and 43d of switch 43 are coupled to loads ($L_1$) and ($L_2$), respectively, via the respective buses 46 and 48 and the respective protective devices 32a and 32b. Similarly, outputs 47c and 47d of switch 47 are coupled to loads ($L_3$) and ($L_4$), respectively, via the respective buses 53 and 55 and the respective protective devices 32c and 32d.

In the system 90, switch 43 is controllable in a similar manner as was described above for enabling the individual loads ($L_1$) and ($L_2$) to be powered by selected ones of the single power bus systems 70 and 72, through different switching arrangements. This can be appreciated in view of FIGS. 2g, 2e, and 5. By example, f or a case in which switching contacts $S_a$, $S_b$, and $S_c$ of the switch 43 are controlled so as to become coupled to contacts (a), (c), and (f), respectively, of the switch 43, power is provided to the load ($L_1$) from the power bus system 70 via the buses 41 and 46, and power is provided to the load ($L_2$) from the power bus system 72 via the buses 45 and 48. As can also be appreciated, various other switching arrangements can also be provided. For example, the switch 43 can be controlled to enable power to be provided to the loads ($L_1$) and ($L_2$) from power bus systems 72 and 70, respectively. Also, for a case in which, for example, each individual power bus system 70 and 72 can provide a sufficient amount of output power for supporting the demand of both of the loads ($L_1$) and ($L_2$), the switch 43 can be controlled to enable both of the loads ($L_1$) and ($L_2$) to be powered by only a single one of the power bus systems 70 and 72. Furthermore, the switch 43 can be controlled to couple output power from both of the power bus systems 70 and 72 to a selected one of the loads ($L_1$) and ($L_2$).

Switch 47 is controllable in a similar manner for enabling the loads ($L_3$) and ($L_4$) to be powered by selected ones of the power bus systems 74 and 76, through various switching arrangements. By example, and as can be appreciated in view of FIGS. 2g, 2f, and 5, for a case in which switching contacts $S_a$, $S_b$, and $S_c$ of the switch 47 are controlled so as to become coupled to contacts (a), (c), and (f), respectively, of the switch 47, power is provided to the load ($L_3$) from the power bus system 74 via the buses 49 and 53, and power is provided to the load ($L_4$) from the power bus system 76 via the buses 51 and 55. As can be appreciated, various other switching configurations can also be provided. For example, the switch 47 can be controlled to enable power to be provided to the loads ($L_3$) and ($L_4$) from the respective single power bus systems 76 and 74. Also, for a case in which, for example, the individual power bus systems 74 and 76 can provide a sufficient amount of output power for supporting the demand of both of the loads ($L_3$) and ($L_4$), the switch 47 can be controlled to enable both of the loads ($L_3$) and ($L_4$) to be powered by only a single selected one of these systems 74 and 76. Also, the switch 47 can be controlled to couple power output from both of the power bus systems 74 and 76 to a selected one of the loads ($L_3$) and ($L_4$).

Figure 1A:
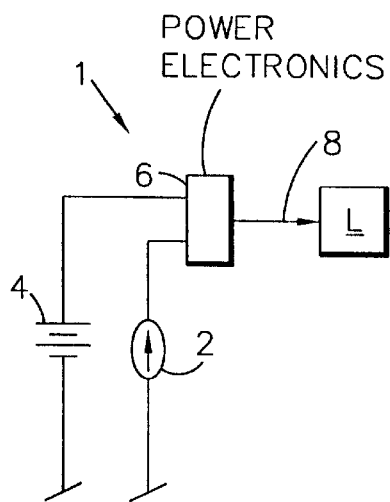
FIG. 1a illustrates a block diagram of a single spacecraft power bus system that is constructed in accordance with the prior art.
Figure 1B:
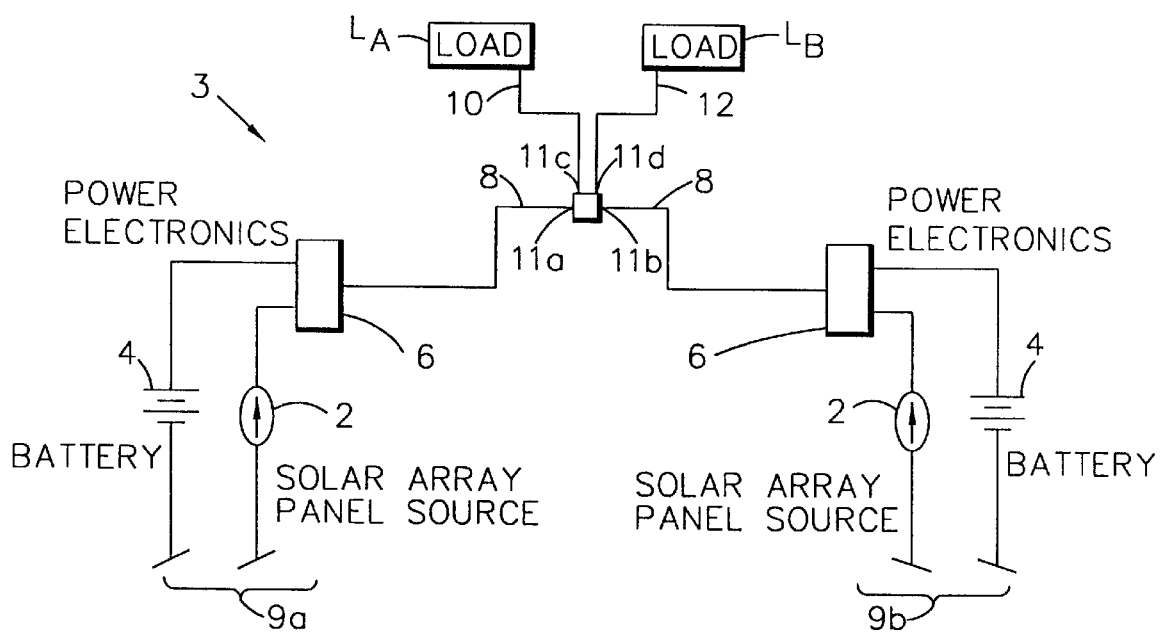
FIG. 1b illustrates a block diagram of a dual spacecraft power bus system that is constructed in accordance with the prior art.
Figure 2C:
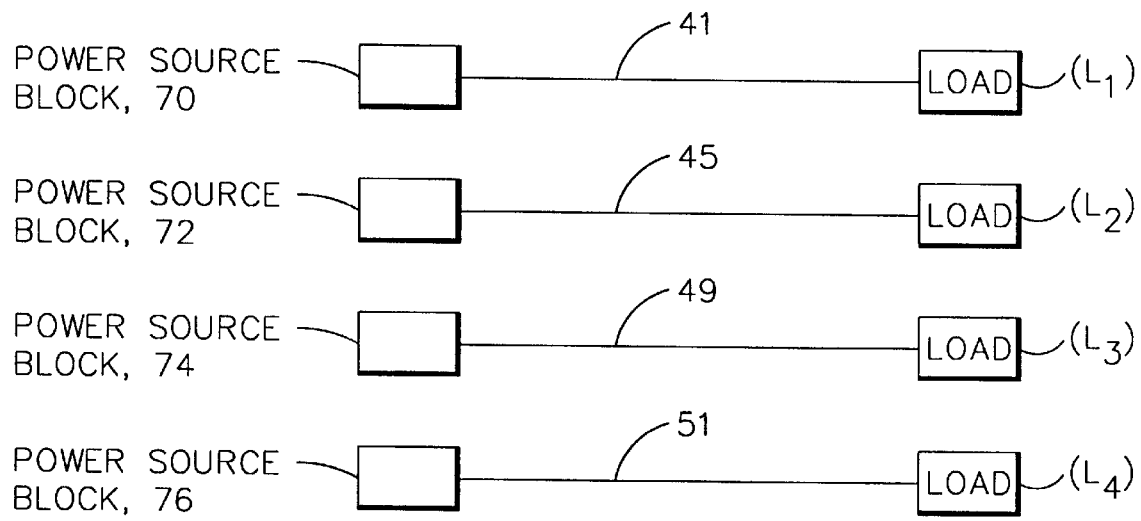
FIG. 2c is a diagram representing power source and load interconnections provided by one embodiment of the quad spacecraft power bus system of the invention.
Figure 2G:
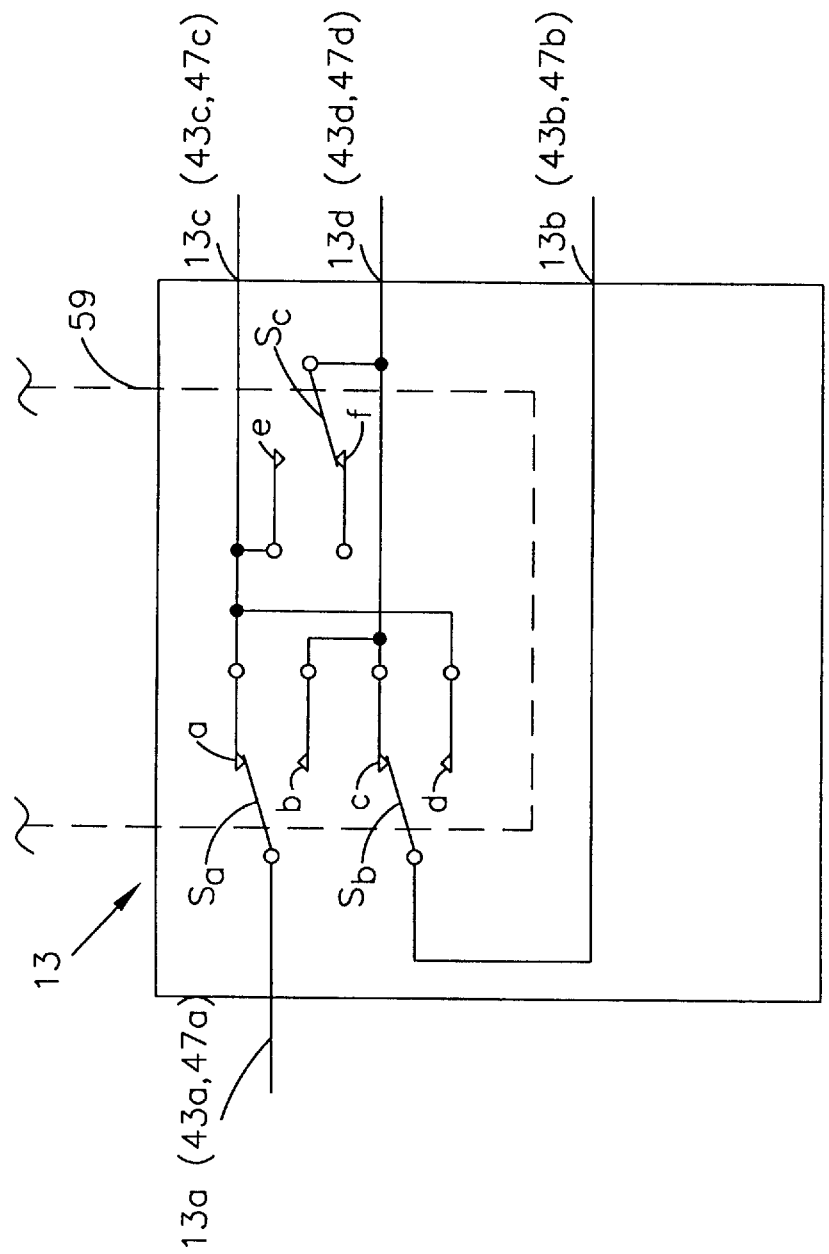
FIG. 2g illustrates a block diagram of a switch matrix.
Figure 6:
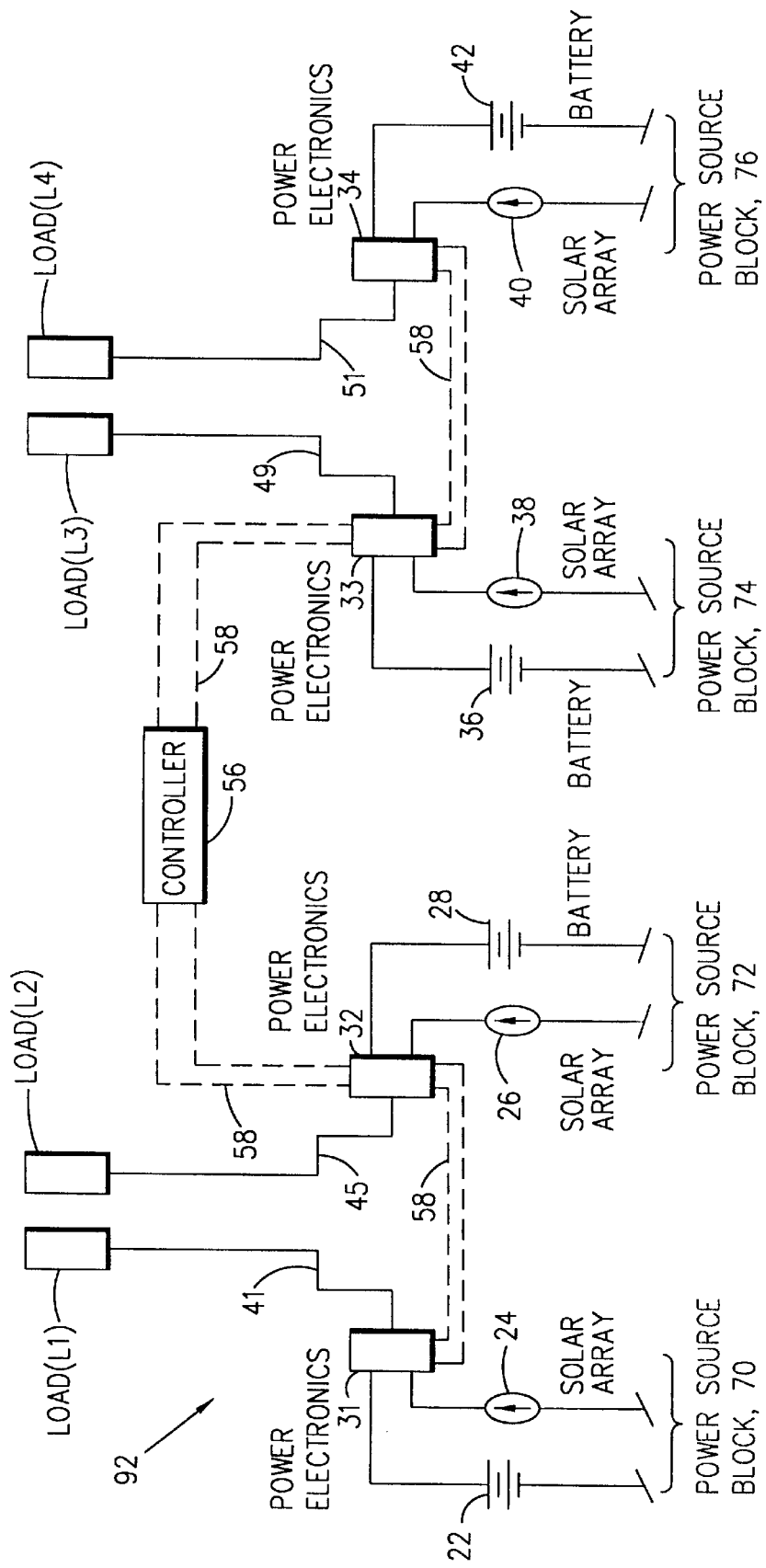
FIG. 6 illustrates a block diagram of a quad spacecraft power bus system that is constructed in accordance with a further embodiment of the invention.

FIG. 6 shows a quad spacecraft power bus system 92 that is constructed in accordance with a further embodiment of the invention. The quad spacecraft power bus system 92 comprises a controller 56, power bus systems 70–76, and buses 41, 45, 49, and 51, that are similar to those described above. However, in this embodiment of the invention, no switches 43, 47, or 30 are provided. Also, the outputs of the power electronics blocks 31–34 of the respective power bus systems 70–76 are coupled directly to respective loads ($L_1$), ($L_2$), ($L_3$), and ($L_4$) via the buses 41, 45, 49, and 51, respectively. In this manner, load ($L_1$) is powered by the power bus system 70, load ($L_2$) is powered by the power bus system 72, load ($L_3$) is powered by the power bus system 74, and load ($L_4$) is powered by the power bus system 76. A diagram representing the connections between the power bus systems 70–76, the respective buses 41, 45, 49, and 51, and the respective loads ($L_1$), ($L_2$), (3), and ($L_4$), is shown in FIG. 2c. Having described a number of embodiments of the invention, a number of advantages offered by the invention will now be described. One advantage relates to the high degree of performance reliability (i.e., tolerance level) provided by the invention, as compared to the performance reliability provided by conventional spacecraft power systems, such as those shown in FIGS. 1a and 1b. More particularly, the use of four power bus systems 70–76 in the quad spacecraft power bus systems described above, as opposed to the use of, by example, only a single power bus system 1 or a dual power bus system 3, enables the quad spacecraft power bus systems of the invention to provide a greater level of system performance reliability (i.e., a greater fault tolerance level) than is provided by these other systems 1 and 3. By example, and referring to the quad spacecraft power bus system 20 of FIG. 2a, for a case in which one or more components of one of the individual power bus systems 70–76 of the system 20, or one of the buses 46, 48, 53, 55, 31a, 31b, 31c, and 31d of the system 20, become short-circuited or otherwise fail to function effectively, one of the spacecraft loads that had been receiving power via the failed component may experience a power loss. However, the remaining spacecraft loads can continue to be powered by the remaining, functioning portions of the system 20 (e.g., this can be accomplished by controlling the switches 43, 47, and 30, if necessary, to provide an appropriate switching arrangement which permits the remaining loads to continue being powered). As such, in this case only one of the four loads experiences a power loss. In contrast, if a component of the dual power bus system 3 of FIG. 1b were to become short-circuited or otherwise fail to function effectively, one of the loads ($L_A$) and ($L_B$) (i.e., one half of the total number of loads being powered by the system 3) may experience a power loss. Also, as can be appreciated, the quad spacecraft power bus systems of the invention provide a greater level of system performance reliability than the single power bus system 1, which cannot continue to power spacecraft loads if a component of the system 1 becomes short-circuited and the load (L) experiences a power loss.

As another example, and referring to the quad spacecraft power bus system 90 of FIG. 5, for a case in which one or more components of one of the power bus systems 70–76 of the system 90, or one of the buses 46, 48, 53, and 55 of the system 90, become short-circuited or otherwise fail to function effectively, and, as a result, one spacecraft load that had been receiving power via the failed component experiences a power loss, the remaining spacecraft loads can remain powered by the other portions of the system 90 that remain functioning. As such, only one quarter of the total number of loads experience a power loss.

As a further example, and referring to the quad spacecraft power bus system 92 of FIG. 6, for a case in which one or more components of one of the power bus systems 70–76 of the system 92, or one of the buses 41, 45, 49, and 51 of the system 92, become short-circuited or otherwise fail to function effectively, a spacecraft load that had been receiving power via the failed component may experience a power loss. As can be appreciated, however, each of the remaining spacecraft loads remain powered by the power bus systems 70–76 that were not affected by the short circuit.

In addition to the high level of performance reliability that can be provided by the various quad spacecraft power bus systems described above, each of the embodiments of the invention offers a number of additional advantages. One advantage is that each system can provide better heat dissipation characteristics than can be provided by, for example, the prior art systems 1 and 3. Another advantage is that commercially-available power regulation circuits (e.g., those which provide regulated output voltages of 28 volts ±2 volts or 100 volts ±2 volts) can be used in the systems. As can be appreciated, because there are four power bus systems 70–76 employed in the quad spacecraft power bus systems of the invention, rather than a lesser number of power bus systems, the quad spacecraft power bus systems can be used to support more loads, while using these commercially-available power regulation circuits, than can be supported by, for example, the systems 1 and 3 of FIGS. 1a and 1b. As a result, problems relating to a need for designing and manufacturing high-power power regulation circuits can often be avoided. Also, as can be appreciated by those skilled in the art, the use of four power bus systems 70–76 is advantageous in cases in which electric propulsion thruster loads are being powered by the quad spacecraft power bus systems of the invention, since electric propulsion thrusters are often divided into four sets of thrusters, and thus each set of thrusters can be powered by an individual one of the power bus systems 70–76. Battery cold charge techniques can also be employed.

A further advantage offered by the quad spacecraft power bus systems of the invention relates to the use of four batteries in the systems. More particularly, because the quad spacecraft power bus systems employ four power bus systems to power loads rather than a lesser number of power bus systems, smaller batteries may be employed within each of the four power bus systems than can be used in, for example, the systems 1 and 3 of FIG. 1a and FIG. 1b, assuming that similar load demands are being supported. As a result, and as can be appreciated by those skilled in the art, it can be easier to control the temperature of the batteries used in the quad spacecraft power bus systems than it can be to control temperatures of the larger batteries employed in systems 1 and 3.

It should be noted that the number of solar arrays and batteries of the quad spacecraft power bus systems described above is not intended to be limiting to the scope of the invention, and that any other suitable number of these components may be employed. For example, for each of the embodiments of the invention, a single battery may be employed rather than four separate batteries to provide power to the system loads when the spacecraft is not receiving solar energy. Also, the teaching of this invention is not limited to a "quad" configuration, but could be expanded to six, eight, or more separate and switchably connected power buses.

While the invention has been particularly shown and described with respect to preferred embodiments thereof, it will be understood by those skilled in the art that changes in form and details may be made therein without departing from the scope and spirit of the invention.

What is claimed is:

1. A power system for a spacecraft, said spacecraft including a plurality of electrical loads, said power system comprising:

N segmented solar array panels, each of said N segmented solar array panels comprising Y electrically isolated solar array segments;

a plurality of power source blocks, each of said plurality of power source blocks including a respective one of said Y electrically isolated solar array segments of a respective one of said N segmented solar array panels, individual ones of said Y electrically isolated solar array segments for receiving solar energy and for providing, in response to receiving solar energy, electrical energy as outputs of respective ones of said power source blocks; and at least one switching means, said at least one switching means being controllable for coupling electrical energy output by individual ones of said plurality of power source blocks to selected individual ones of said plurality of electrical loads, thereby enabling individual ones of said power source blocks to power a selected at least one of said electrical loads.

2. A power system for a spacecraft as set forth in claim 1, wherein N and Y are each equal to 2, wherein there are two switching means, and wherein a first one of said switching means is for coupling electrical energy output by individual ones of a first pair of said power source blocks to selected ones of a first pair of said electrical loads, and wherein a second one of said switching means is for coupling electrical energy output by individual ones of a second pair of said power source blocks to selected ones of a second pair of said electrical loads.

3. A power system for a spacecraft as set forth in claim 1, further comprising a controller, wherein N and Y are each equal to 2, wherein there are at least three switching means, and wherein:

a first one of said at least three switching means has a first plurality of inputs and a second plurality of inputs, said first switching means being controllable by said controller for coupling electrical energy applied to individual ones of said first and second plurality of inputs to selected individual ones of said plurality of electrical loads;

a second one of said at least three switching means is controllable by said controller for coupling electrical energy output by individual ones of said first pair of power source blocks to selected ones of said first plurality of inputs of said first switching means; and a third one of said at least three switching means is controllable by said controller for coupling electrical energy output by individual ones of said second pair of power source blocks to selected ones of said second plurality of inputs of said first switching means.

4. A power system for a spacecraft as set forth in claim 1, further comprising at least one battery for providing electrical energy as outputs of said power source blocks during periods when at least one of said Y electrically isolated solar array segments of said N segmented solar array panels is not receiving solar energy.

5. A power system for a spacecraft as set forth in claim 4, wherein each respective power source block further includes means for regulating electrical energy output by said at least one battery and said electrically isolated solar array segment of the power source block to a predetermined voltage.

6. A power system for a spacecraft as set forth in claim 1, wherein said at least one switching means is controllable for coupling electrical energy output by said individual ones of said plurality of power source blocks to said selected ones of said plurality of electrical loads, for enabling at least one of said individual power source blocks to power a selected at least one of said electrical loads.

7. A power system for a spacecraft, said spacecraft including a plurality of electrical loads, said power system comprising:

N segmented solar array panels, each of said N segmented solar array panels comprising Y solar array segments;

a plurality of power source blocks, each of said plurality of power source blocks including a respective one of said Y solar array segments of a respective one of said N segmented solar array panels, individual ones of said Y solar array segments for receiving solar energy and for providing, in response to receiving solar energy, electrical energy as outputs of respective ones of said power source blocks;

at least one switching means, said at least one switching means being controllable for coupling electrical energy output by individual ones of said plurality of power source blocks to selected individual ones of said plurality of electrical loads, thereby enabling individual ones of said power source blocks to power a selected at least one of said electrical loads, and wherein said power system further comprises a controller for controlling said at least one switching means in accordance with information uplinked to the spacecraft from a terrestrial station.

8. A quad spacecraft power bus system, said quad spacecraft power bus system including a plurality of electrical loads, said quad spacecraft power bus system comprising:

a plurality of segmented solar array panels, each of said plurality of segmented solar array panels comprising a plurality of electrically isolated solar array segments;

four individual power bus systems, each of said individual power bus systems including a respective output bus and a respective one of said electrically isolated solar array segments, said respective one of said electrically isolated solar array segments for outputting electrical energy through said output bus; and at least one switching means, said at least one switching means being controllable for coupling electrical energy output through said output bus of respective ones of said individual power bus systems to selected ones of said electrical loads, thereby enabling individual ones of said power bus systems to power a selected at least one of said electrical loads.

9. A quad spacecraft power bus system as set forth in claim 8, further comprising a plurality of primary buses, and wherein said at least one switching means is controllable for coupling said electrical energy output through said output bus of said respective ones of said individual power bus systems to selected ones of said electrical loads through respective ones of said plurality of primary buses.

10. A quad spacecraft power bus system as set forth in claim 8, wherein each of said individual power bus systems further includes a battery for providing electrical energy through said respective output bus of said individual power bus system during periods when said spacecraft is not exposed to solar energy.

11. A quad spacecraft power bus system as set forth in claim 8, wherein said at least one switching means includes a first switching means, a second switching means, and a third switching means, and wherein:

said first switching means has a first plurality of inputs and a second plurality of inputs, said first switching means being controllable for coupling electrical energy applied to individual ones of said first and second plurality of inputs to selected individual ones of said electrical loads;

said second switching means is controllable for coupling electrical energy output through said respective output bus of respective ones of a first pair of said individual power bus systems to selected ones of said first plurality of inputs of said first switching means; and said third switching means is controllable for coupling electrical energy output through said respective output bus of respective ones of a second pair of said individual power bus systems to selected ones of said second plurality of inputs of said first switching means.

12. A quad spacecraft power bus system as set forth in claim 11, further comprising a plurality of primary buses, and wherein said first switching means is controllable for coupling said electrical energy applied to said individual ones of said first and second plurality of inputs of said first switching means to said selected individual ones of said plurality of electrical loads through respective ones of said plurality of primary buses.

13. A quad spacecraft power bus system as set forth in claim 8, wherein each of said individual power bus systems further includes means for regulating voltages of said electrical energy output by said respective electrically isolated solar array segment of said individual power bus system.

14. A quad spacecraft power bus system as set forth in claim 8, wherein said at least one switching means includes a first switching means and a second switching means, and wherein:

said first switching means is controllable for coupling electrical energy output through said output bus of respective ones of a first pair of said individual power bus systems to selected ones of a first group of said plurality of electrical loads; and said second switching means is controllable for coupling electrical energy output through said output bus of respective ones of a second pair of said individual power bus systems to selected ones of a second group of said plurality of electrical loads.

15. A quad spacecraft power bus system, said quad spacecraft power bus system including a plurality of electrical loads, said quad spacecraft lower bus system comprising:

four individual power bus systems, each of said individual power bus systems including a respective output bus and a respective at least one power source for outputting electrical energy through said output bus;

at least one switching means, said at least one switching means being controllable for coupling electrical energy output through said output bus of respective ones of said individual power bus systems to selected ones of said electrical loads, thereby enabling individual ones of said power bus systems to power a selected at least one of said electrical loads;

wherein said respective at least one power source of respective ones of said individual power bus systems comprises a solar array panel; and wherein said quad spacecraft power bus system further comprises a controller for controlling said at least one switching means in accordance with information uplinked to the spacecraft from a terrestrial station.

16. A power system for a spacecraft, said power system including a plurality of electrical loads, said power system further comprising:

X power systems, each of said X power systems comprising a respective at least one power source for outputting electrical energy to a respective one of X outputs of said X power systems; and a plurality of buses, individual ones of said plurality of buses being coupled between respective ones of said X outputs and respective ones of said electrical loads, thereby enabling said X power systems to power said respective electrical loads; wherein said at least one power source of respective ones of a first pair of said X power systems comprises a respective one of a plurality of electrically isolated solar array segments of a first solar array panel of said spacecraft, and wherein said at least one power source of respective ones of a second pair of said X power systems comprises a respective one of a plurality of electrically isolated solar array segments of a second solar array panel of said spacecraft.

17. A power system for a spacecraft as set forth in claim 16, wherein said respective at least one power source of each of said X power systems further includes an energy storage device for providing electrical energy to a respective one of said X outputs of said X power systems during periods when said spacecraft is not exposed to solar energy.

18. A power system for a spacecraft as set forth in claim 16, wherein X is equal to 4.

* * * * *